United States Patent [19]
Horton et al.

[11] Patent Number: 5,241,587
[45] Date of Patent: Aug. 31, 1993

[54] POLLING CONTROLLER

[75] Inventors: Stephen W. Horton, Bellingham; John D. Hoskinson, Pacific, both of Wash.

[73] Assignee: Teltone Corporation, Bothell, Wash.

[21] Appl. No.: 725,446

[22] Filed: Jul. 3, 1991

[51] Int. Cl.[5] .................................. H04M 11/00
[52] U.S. Cl. ........................ 379/92; 379/97; 379/98
[58] Field of Search .............. 379/92, 98, 107, 106, 379/102, 104, 96, 97, 93; 375/8, 121

[56] References Cited

U.S. PATENT DOCUMENTS

| | | | |
|---|---|---|---|
| 4,394,540 | 7/1983 | Willis et al. | 379/107 |
| 4,566,030 | 1/1986 | Nickerson et al. | 358/84 |
| 4,833,618 | 5/1989 | Verma et al. | 379/107 |
| 4,864,603 | 9/1989 | Battmann et al. | 379/106 |
| 4,912,552 | 3/1990 | Allison, III et al. | 379/92 |
| 5,038,372 | 8/1991 | Elms et al. | 379/94 |
| 5,128,988 | 7/1992 | Cowell et al. | 379/107 |

FOREIGN PATENT DOCUMENTS

8908959  9/1989  PCT Int'l Appl. ............ 379/92

*Primary Examiner*—Jin F. Ng
*Assistant Examiner*—Stella L. Woo
*Attorney, Agent, or Firm*—Christensen, O'Connor, Johnson & Kindness

[57] ABSTRACT

A polling controller (21) for a polling system in which a central station (11) sequentially contacts a series of remote stations (13) in order to transmit data to or receive data from the remote stations is disclosed. The polling controller (21) is connected between the telco terminals of a central station modem (23) and a telco line (18). When the central station modem (23) goes off-hook, a DTMF transceiver and answer tone detector (45) is connected to the telco line (18). When a dial code that follows the telephone number of the remote station being called by the central station modem is detected, the central station modem is placed on hold. Thereafter, a transfer code, which may be the same as the dial code, is sent to the called remote station (13). In response, a switch (31) at the remote station (13) connects its telco line (18) to a port, determined by the nature of the dial code, and transmits an answer tone to the polling controller (31). When the answer tone is detected by the polling controller (31), the central station modem is taken off hold and allowed to communicate with the selected modem (35a, 35b, ...) of the remote station (13). If a priority telephone (33) connected to one of the ports of the switch (31) of the remote station (13) goes off-hook, the switch (31) of the remote station (13) disconnects the remote station modem and generates a priority interrupt tone that causes the central station modem (23) to be disconnected. As a result, telco contact between the central station and the remote station is broken and the telephone (33) is given immediate access to the telco system.

27 Claims, 9 Drawing Sheets

POLLING CONTROLLER

TECHNICAL AREA

The invention relates to polling systems and, more particularly, computer polling systems that use the telephone network.

BACKGROUND OF THE INVENTION

In recent years, it has become commonplace for a computer located at a central station to use the telephone network to automatically contact remote computers to either receive data from the remote computers or supply data to the remote computers. For example, the headquarters of a store chain may contact, on a daily or weekly basis, each of the chain's stores to obtaining gross receipts information and information about the numbers of specific items sold during the preceding day or week so that product inventories can be rapidly and quickly replenished. In most instances, such contacts are usually automatically made through modems with dedicated telephone lines when telephone company rates are low, i.e., during the evening hours.

Previously developed systems include a modem located at the central station for coupling the central station's computer to a telephone company (i.e., telco) line. Among other things, the computer sequentially generates the signals necessary to cause the modem to automatically dial the telephone numbers of remote stations. After dialing the telephone number of a remote station, the modem may also transmit a security code or hang up and have the remote station call back on a predetermined telephone number.

If the central station and the remote station are both using dedicated telco lines, the central station's computer is connected to the remote station as soon as the remote station modem responds to the call from the central station by sending an answer tone. While such systems are satisfactory, they have one significant disadvantage. They are expensive because they rely on expensive, dedicated lines, i.e., central office telephone lines that are only used for making telephone calls from the central station to the remote stations. Dedicated lines are located on both ends of the system—between the central station and its central office and between each remote station and its related central office.

In an effort to avoid the need for dedicated lines, attempts have been made to use shared lines and switches at the remote stations connect central station computers to remote stations. In switched systems the central station modem is required to repeat an access code such as *7, *77, etc., for a predetermined period of time fixed by the central station's computer. During the fixed period of time, a telephone connection is made to the remote station and the remote station sends an answer tone to the central station.

The central station must wait until the end of the fixed period of time before beginning data communication because data communication cannot take place until the access code stops. In order to make sure all remote stations are contacted, the fixed period of time must be the greatest period of time required to access any given station. Telephone contact time between a calling station and a called station is random, usually falling within a 3- to 32-second range. The average time to make contact usually falls in the middle of this range, i.e., around 16 seconds. As a result, on an average, 16 seconds of data communication time are lost each time a central station "dials" a remote station using a switching device. While, on an individual basis, 16 seconds is relatively short, this interval rapidly adds up when a central station seeks to contact several hundred or several thousand remote stations in an evening. In such cases, 16 seconds per call in lost data transmission time can cost several hundred dollars per day in unnecessary long-distance telephone charges.

Unfortunately, a single access code transmission on a shared line is unsatisfactory because, in the past, shared line loop activity can cause incorrect modem operation. The present invention is directed to avoiding unnecessary telco charges and improving data communication by providing a polling controller that controls telephone contact between a central station modem and a telco line such that data communication commences immediately after a telephone connection is made between the central station and a remote station.

SUMMARY OF THE INVENTION

In accordance with this invention, a polling controller for a computerized polling system in which a central station sequentially contacts a series of remote stations via a telco network in order to transmit data to or receive data from computers or other data sources located at the remote stations is provided. The polling controller is connected between the telco terminals of a central station modem and a telco line. When the central station modem goes off-hook and dials the number of a remote station plus a dial (access) code, the central station modem is prevented from responding to telco line loop activity, preferably by being disconnected from the telco line and placed on hold. Thereafter, the polling controller repetitively generates a transfer code, which may be the same as the dial code. Immediately after the called remote stations answers, the central station modem is reconnected to the telephone line, allowing data communication to begin.

In accordance with other aspects of this invention, the polling controller includes a signal (e.g., a DTMF) transceiver and detector. The signal transceiver and detector detects the presence of telephone signals on the telco line and applies telephone signals to the telco line.

In accordance with further aspects of this invention, the polling controller includes a first coupling means for coupling the signal transceiver and detector to and disconnecting the signal transceiver and detector from the telco line.

In accordance with still other aspects of this invention, the polling controller includes a hold bridge and a coupling device for coupling the central station modem either to the telco line or the hold bridge.

In accordance with further aspects of this invention, the remote station includes a switch having a plurality of ports. In response to the transfer code, the switch connects the telco line connected to the remote station to a specific port, said specific port being connected to a remote station modem that, in turn, is connected to a computer or other data device.

In accordance with still further aspects of this invention, the remote station switch includes a priority port. In response to a telephone or the like connected to the priority port going off-hook, the remote station switch generates a priority interrupt tone that causes the polling controller to disconnect the central station modem from the telco line.

As will be readily appreciated from the foregoing description, a system incorporating a polling controller formed in accordance with this invention allows data communication between a central station and a remote station to begin as soon as a telephonic connection is made between the central station and the remote station. Data transmission can occur immediately after a connection is made, regardless of whether the connection occurs in 3 seconds, 32 seconds, or any other interval. Because no lost time occurs, long-distance charges are lower than they would be with prior systems that do not include a polling controller formed in accordance with the invention. Further, overall data transmission time is improved. Also, because the modem of the central station is placed on hold after being disconnected from the telco line, it is prevented from downshifting, i.e., dropping to lower baud rate, in response to loop activity. That is, many modems will drop from a higher baud rate to a lower baud rate in response to loop activity when seeking to contact another modem. Obviously, data transmission at a lower baud rate takes longer than at a higher baud rate. A polling controller formed in accordance with this invention prevents lower baud rate transmission as a result of the telephone loop activity that occurs during the period of time that contact is being made between a central station and a remote station.

BRIEF DESCRIPTION OF THE DRAWINGS

The foregoing and other advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
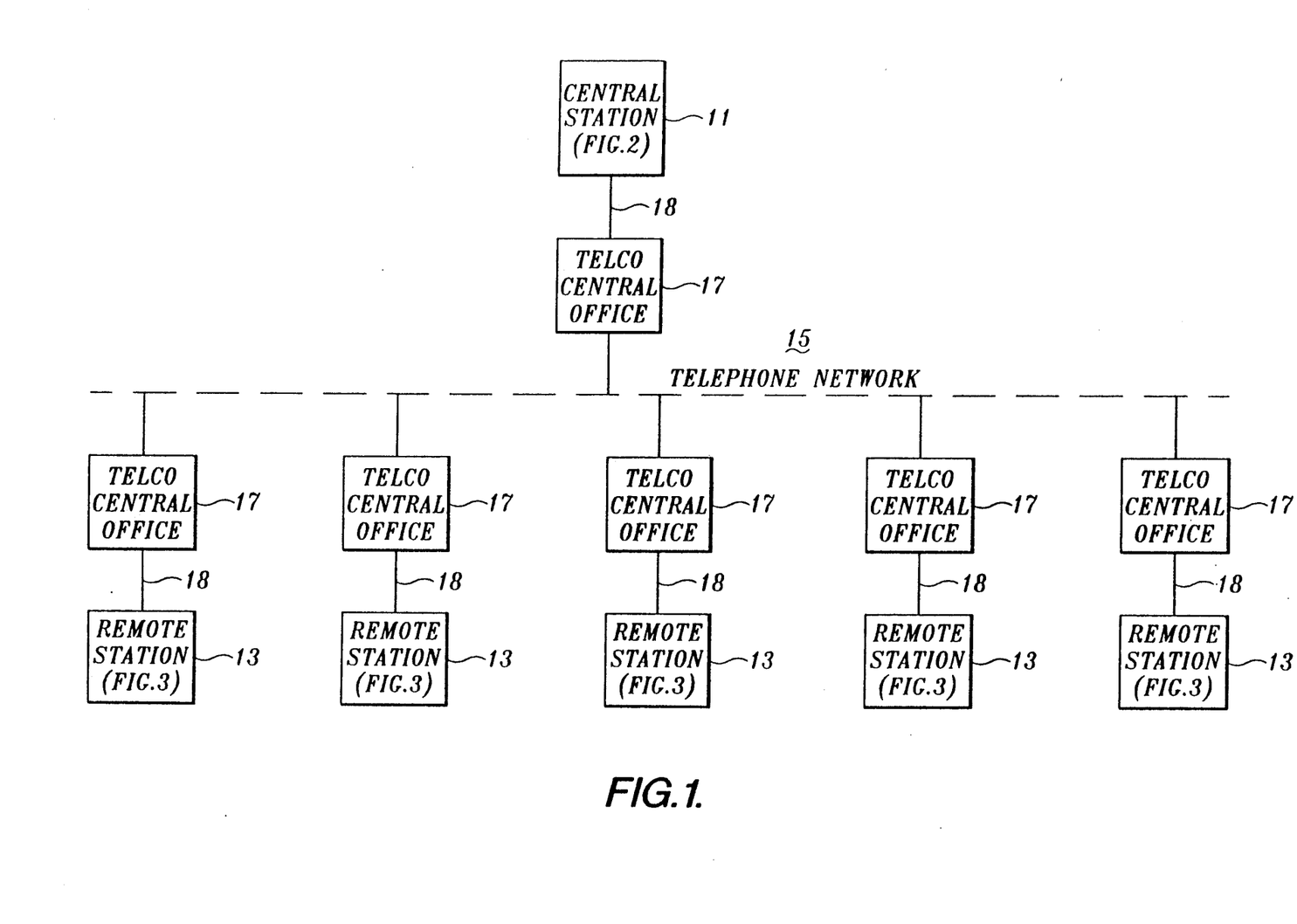
FIG. 1 is a block diagram of a telephone polling system in which a polling controller formed in accordance with this invention is useful.

FIG. 1 illustrates a polling system of the type with which the present invention is useful. The polling system, illustrated in FIG. 1 includes a central station 11 and a plurality of remote stations 13 connected together via a telephone company (telco) network 15. The telco network includes a plurality of central offices 17, one connected to the central station 11 and others connected to the remote stations 13 via telco lines 18. The central offices are connected together via conventional telephone links, i.e., wires, microwave and optical cables and other central offices (not shown). Since the details of the telco network 15 do not form a part of the present invention and since such details are well known, they are not further described here.

Figure 2:
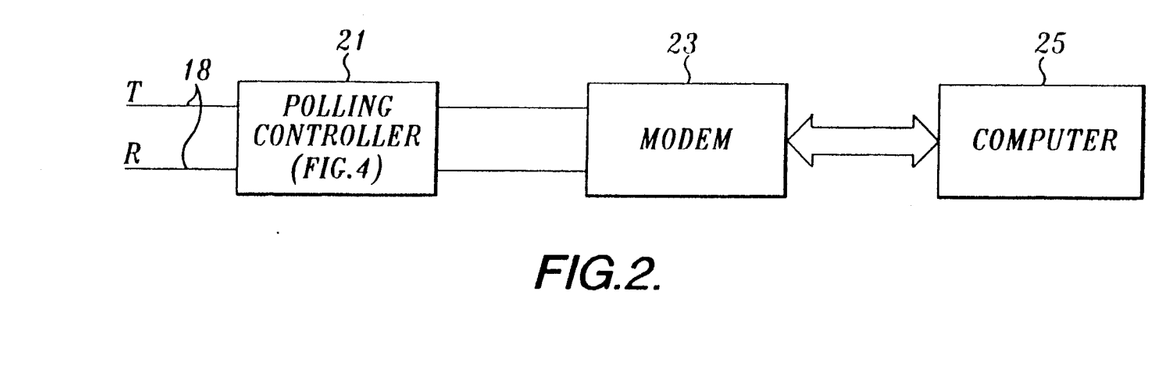
FIG. 2 is a block diagram of a central station suitable for use in the system illustrated in FIG. 1 that contains a polling controller formed in accordance with this invention.

FIG. 2 is a block diagram of a central station 11. The central station 11 includes a polling controller 21 formed in accordance with the present invention, a modem 23 and a computer 25. In a conventional manner, the modem 23 forms an interface that allows the central station computer 25 to communicate with other computers and/or other electronic data sources via a telephone network. The polling controller 21 is located between the modem 23 and the tip (T) and ring (R) telco lines 18 that connect the central station 11 to its associated telco central office 17. In a conventional manner, the central station computer 25 sequentially generates the signals necessary for the modem to dial telephone numbers and generate appropriate interconnect instructions in the form of an access or dial code, such *7, *77, etc. The sequentially produced telephone numbers and the interconnect instructions cause telephone connections to be made to the remote stations 13. Thus, the remote stations are "polled" in sequence. Since polling computers and modems are well known, they are not described further here.

In accordance with this invention, the polling controller 21 interfaces the modem 23 to the tip and ring lines 18 of the telco system in a manner that increases access time. Rather than requiring that the central station computer wait for a predetermined period of time after it generates the signals necessary to contact a remote station before data communication begins, the polling controller 21 allows the central station computer to begin data communication immediately after the called remote station answers. A polling controller formed in accordance with the invention is illustrated in FIG. 4 and described below.

Figure 3:
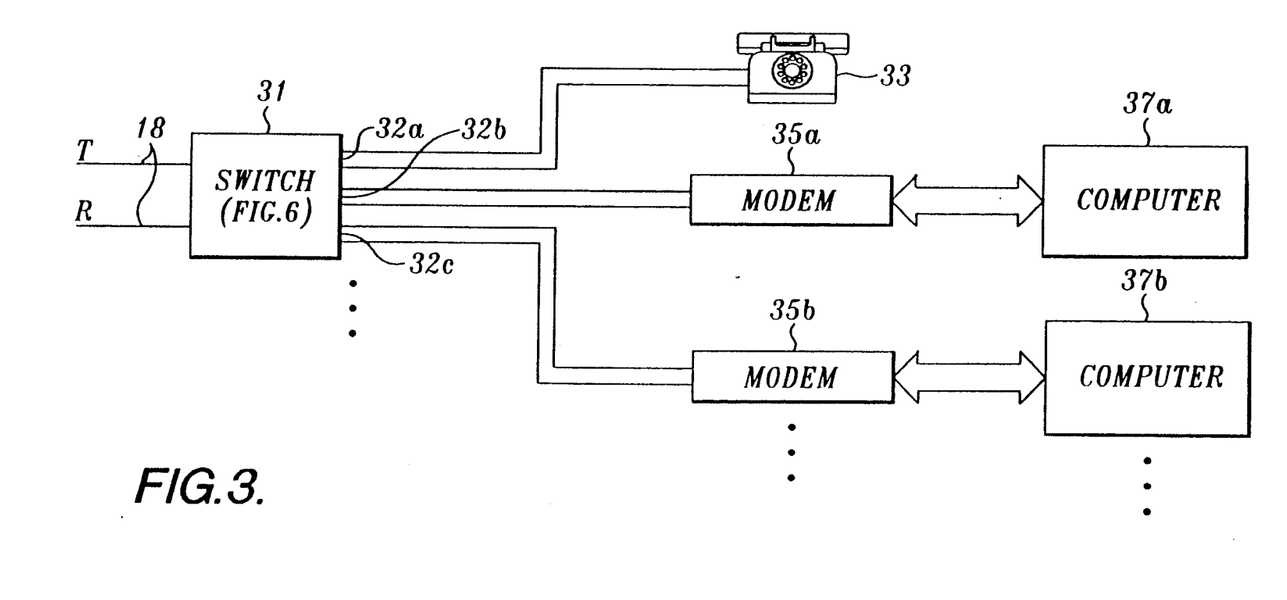
FIG. 3 is a block diagram of a remote station suitable for use in the system illustrated in FIG. 1 that contains a switch having a priority interrupt port.

FIG. 3 illustrates an exemplary remote station. The remote station illustrated in FIG. 3 includes a switch 31 formed in accordance with the invention, a telephone 33, one or more modems 35a, 35b, ...and one or more computers 37a, 37b, .... The switch is connected to the tip (T) and ring (R) telco lines 18 that connect the remote station 13 to a telco central office 17. The switch includes a plurality of ports 32a, 32b, 32c.... One port 32a is connected to the telephone 33 and other ports 32b, 32c, ... are connected to each of the modems 35a, 35b, .... The modems 35a, 35b, ... in turn are connected to their respective computers 37a, 37b, ....

As better understood from the following description, the switch 31 responds to telephone calls received on the tip and ring lines. In response to those telephone calls, the switch 31 either connects the telephone 33 or one of the modems 35a, 35b, ... to the tip and ring lines. When a modem is connected, its related computer 37a, 37b,... can receive and send data via the telco network 15 to the calling computer. As a result, when the central station computer 25 calls the switch 31 of a specific remote station 13 and sends a suitable port code, it will be connected to one of the computers 37a, 37b,... of the remote station. In the other direction, the switch responds to "calls" made by any of the remote station's computers 37 or by the telephone 33. That is, either the telephone 33 or any of the computers 37 can access the telephone network when the switch 31 is not connecting the tip and ring lines 18 to another remote station device. Further, if the switch 31 is connecting the tip and ring lines 18 to one of the modems 35a, 35b, ... and the telephone 33 goes off-hook, a priority interrupt will occur. The priority interrupt will cause a disconnection of both the central station modem and the remote station modem and a connection of the telephone 33 to the tip and ring lines 18. As a result, in an emergency, the telephone 33 has immediate access to the telco network.

Figure 4:
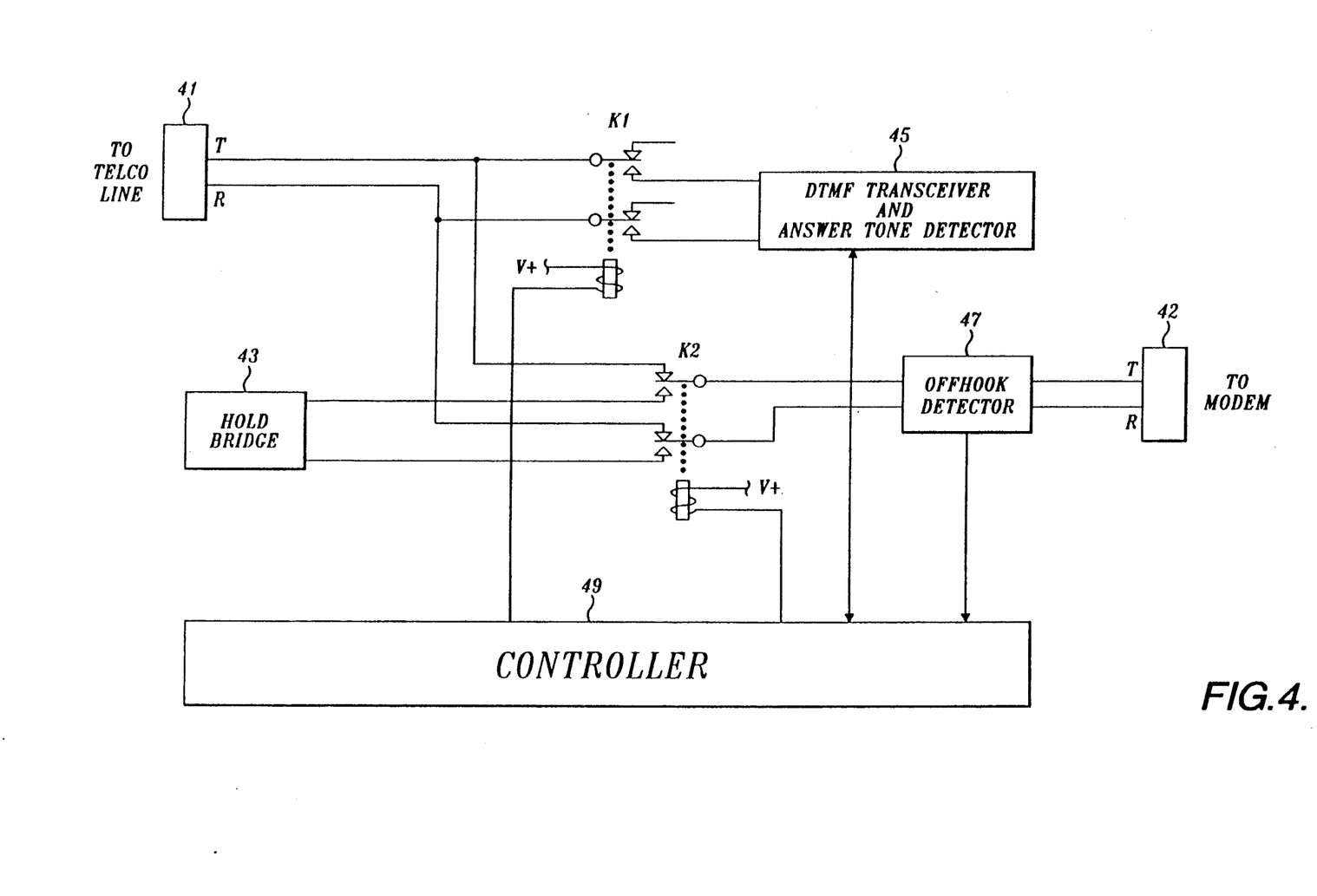
FIG. 4 is a partially block and partially schematic diagram of a polling controller formed in accordance with this invention that is suitable for use in the central station illustrated in FIG. 2.

FIG. 4 is a block diagram of a polling controller suitable for use in the central station 11 illustrated in FIG. 2. The polling controller illustrated in FIG. 4 comprises first and second telephone line connectors 41 and 42, a hold bridge 43, a DTMF transceiver and answer tone detector 45, an off-hook detector 47 and a controller 49. The polling controller illustrated in FIG. 4 also comprises two double-pole, double-throw (DPDT) relays designated K1 and K2.

The tip (T) terminal of the first telco line connector 41 is connected to the common terminal of one of the sets of contacts of relay K1 and to the normally closed terminal of one of the sets of contacts of relay K2. The ring (R) terminal of the first telco line connector 41 is connected to the common terminal of the other set of contacts of relay K1 and to the normally closed terminal of the other set of contacts of relay K2. The normally closed terminals of both sets of contacts of relay K1 are unconnected. The normally open terminals of both sets of contacts of relay K1 are connected to the DTMF transceiver and answer tone detector 45. The coil of relay K1 is connected between a voltage source designated V+ and a control output of the controller 49.

The hold bridge 43 is connected to the normally open terminals of both sets of contacts of relay K2. The common terminals of both sets of contacts of relay K2 are connected to the off-hook detector 47. The coil of relay K2 is connected between V+ and a control output of the controller 49. The controller 49 is also connected to the DTMF transceiver and answer tone detector 45 and to the offhook detector 47 to apply control signals to and receive information signals from these items. Finally, the off-hook detector 47 is connected to the tip and ring (T) and (R) terminals of the second telephone connector 42. The first telephone connector 41 is for making a connection to the telco line and the second telephone connector 42 is for making a connection to the modem in the manner illustrated in FIG. 2 and described above.

Figure 5:
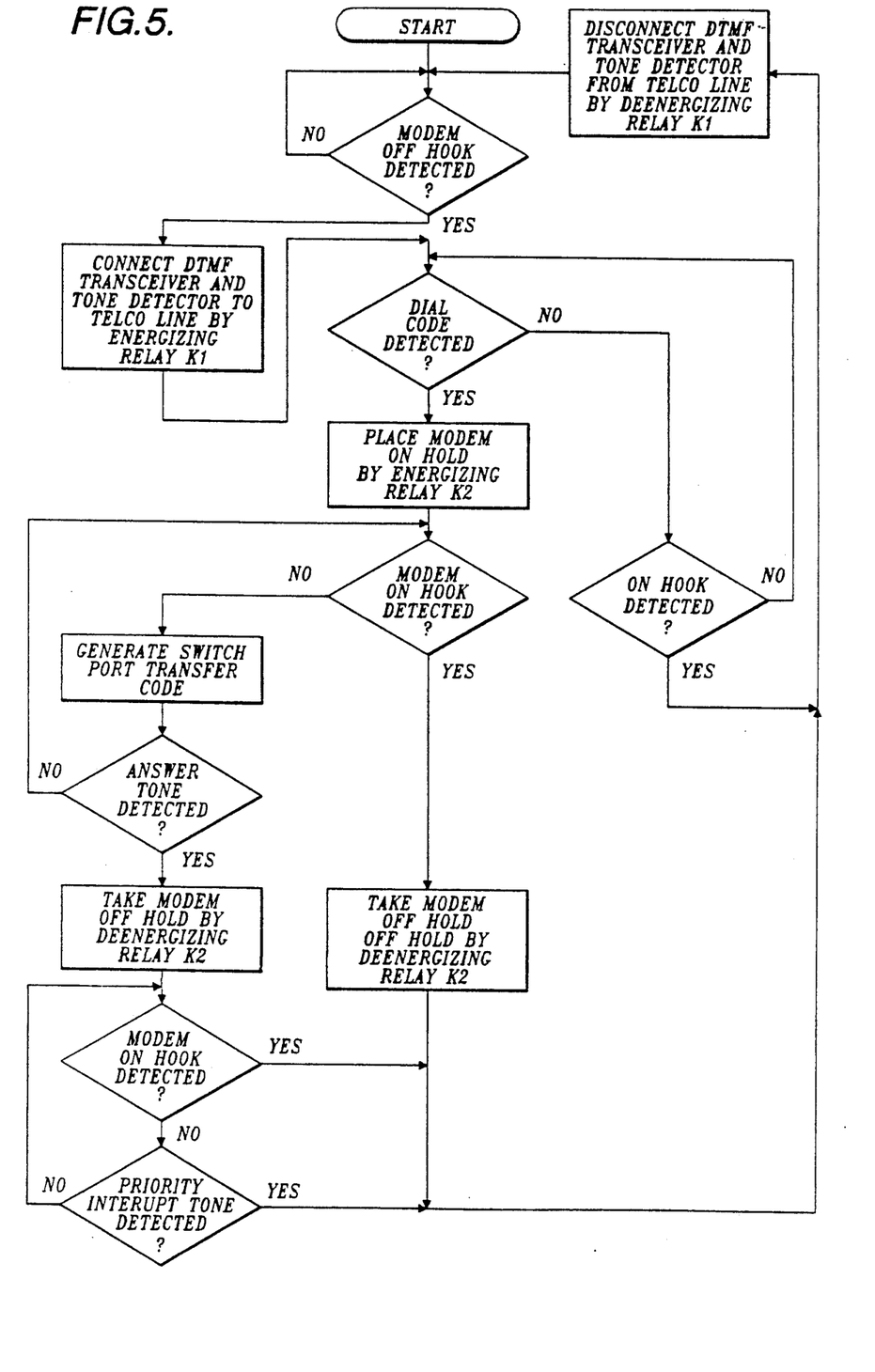
FIG. 5 is a flow diagram illustrating the operation of the polling controller illustrated in FIG. 4.

FIG. 5 is a flow diagram illustrating the operation of the polling controller 21 illustrated in FIG. 4. That is, FIG. 5 illustrates how the controller 49 controls the operation of relays K1 and K2 and the other elements illustrated in FIG. 4. In this regard, preferably, the controller 49 is formed by a microprocessor and associated electronics. The microprocessor is programmed to control relays K1 and K2 and the DTMF transceiver and answer tone detector 45 in the manner illustrated in FIG. 5 in response to telco line signals and signals produced by the off-hook detector 47.

After being energized and performing any required or desired test routines (not shown), the controller continuously tests the off-hook detector 47 to determine if the central office modem 23 is off-hook. If the central office modem is not off-hook, the test is repeated. Thus, the controller idles i.e., takes no action, until the central office modem goes off-hook. When the central office modem goes off-hook, as a result of conventional well-known actions taken by the computer 25, the DTMF transceiver and tone detector is connected to the telco lien by energizing relay K1. Next, the controller tests the DTMF transceiver and answer tone detector 45 to determine if an access or dial code (produced by the central office computer 25 via the modem 23) has been detected. If a dial code, such as *7 or *77, is not detected, the off-hook detector 47 is again tested to determine if the modem is still off-hook. If the central office modem 23 is still off hook, the dial code detected test is repeated. The controller remains in this loop until either a dial code is detected or the modem goes on-hook. During this period of time, prior to the creation of the dial code, the central station modem 23 dials the number of the remote station to be contacted. If the modem goes on-hook, the DTMF transceiver and tone detector is disconnected from the telco line by deenergizing relay K1.

When a dial code is detected, the modem is placed on hold by energizing relay K2. This results in the hold bridge 43 being connected to the output of the modem 43. The hold bridge prevents the modem 43 from responding to activity on the telco line, such as "down shifting", i.e., the modem shifting to a lower baud rate, in response to activity on the telco line. In this regard, as is well known to those skilled in the art, modems will normally start at a high baud rate, such as 9600 baud and sequentially shift to lower baud rates, i.e., 4800 and 2400 baud, until a connection is made. Such downshifting usually occurs in response to activity of the telco line that leads the modem to believe that data communication can only occur at a lower baud rate. Connecting the hold bridge 43 to the modem via the off-hook detector 47 prevents downshifting from occurring.

Next, a test is made to determine if the modem is on-hook. If the modem is on-hook, the modem is taken off hold by de-energizing relay K2. Thereafter, the DTMF transceiver and tone detector are disconnected from the telephone line by de-energizing relay K1.

If the modem remains on-hook, a switch port transfer code is generated by the controller. This may be a separate code, or it may be a copy of the dial code produced by the central office computer 25. In any event, after the switch port transfer code has been transmitted, a test is made to determine if an answer tone from the remote station has been detected by the DTMF transceiver and answer tone detector 45. If an answer tone has not been detected, the modem on-hook detected test is repeated followed by another transmission of the switch port transfer code. When an answer tone is detected, the modem is taken off hold by de-energizing relay K2. At this point, the modem is connected to the telco line and, via the telco network, to the called remote station. Thus, data transmission can take place. Next, a test is made to determine if the modem is on-hook. If the modem is on-hook, a test is made to determine if a priority interrupt tone generated by the remote station in the manner hereinafter described has been detected. If a priority interrupt tone has not been detected, the modem on-hook test is repeated. The controller remains in this loop until either data communication ends and the central station modem goes on-hook or a priority interrupt tone is detected. After the central station modem goes on-hook, or if a priority interrupt tone is detected, the DTMF transceiver and answer tone detector is disconnected from the telco line by de-energizing relay K1.

As will be readily appreciated from the foregoing description, rather than waiting for a fixed period before telephone communication begins, the inclusion of a polling controller of the type illustrated in FIGS. 4 and 5 and described above allows the central station computer 25 to begin data communication as soon as a telephone connection is made to the called remote station. Thus, telephone network use time and associated charges, as well as overall data communication time, are reduced.

Figure 6:
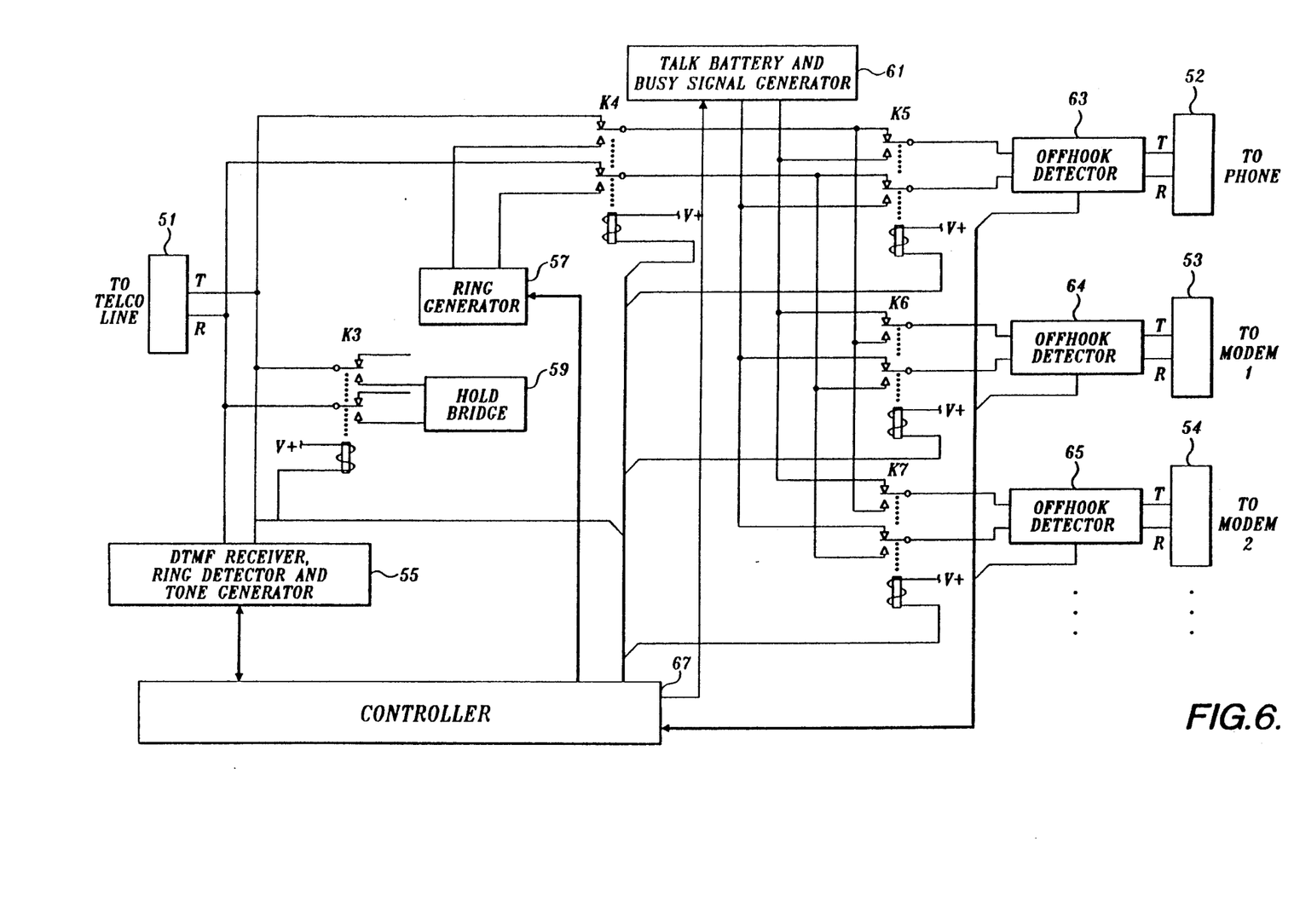
FIG. 6 is a partially block and a partially schematic diagram of a switch suitable for use in the remote station illustrated in FIG. 3.

The remote station switch illustrated in FIG. 6 includes: a plurality of telephone line connectors 51, 52, 53, and 54; a DTMF receiver, ring detector, and tone generator 55; a ring generator 57; a hold bridge 59; a talk battery and busy signal generator 61, a plurality of off-hook detectors 63, 64, and 65; and a controller 67. The remote switch also includes five double-pole, double-throw (DPDT) relays designated K3, K4, K5, K6, and K7.

One of the connectors 51 includes a pair of terminals for connecting the switch to the tip (T) and ring (R) wires of the telco line 18 connected to the remote station. The other connectors 52, 53, and 54 form the phone and modem ports and include terminals for connecting the ports to the tip (T) and ring (R) terminals of the telephone and the modems, illustrated in FIG. 3 and described above.

The tip and ring terminals of the first or telco line connector 51 are connected to the DTMF receiver, ring detector and tone generator 55, the common terminals of relay K3 and the normally closed terminals of relay K4. The normally closed terminals of relay K3 are unconnected. The normally open terminals of relay K3 are connected to the hold bridge 59. The coil of relay K3 is connected between a voltage source designated V+ and a control output of the controller 67. The DTMF receiver, ring detector and tone generator is connected to the controller 67. The ring generator 57 and the talk battery and busy signal generator 61 are also connected to control outputs of the controller 67. Tip and ring terminals of the ring generator 57 are connected to the normally open terminals of relay K4. The coil of relay K4 is connected between V+ and a control output of the controller 67.

One of the common terminals of relay K4 is connected to a normally closed terminal of one of the sets of contacts of relay K5, a normally open terminal of one of the sets of contacts of relay K6 and a normally open terminal of one of the sets of contacts of relay K7. The other common terminal of relay K4 is connected to the normally closed terminal of the other sets of contacts of relay K5 to the normally open terminal of the other set of contacts of relay K6 and to the normally open terminal of the other set of contacts of relay K7. Tip and ring terminals of the talk battery and busy signal generator 61 are connected to the normally open terminals of relay K5 and to the normally closed terminals of relays K6 and K7. The coils of relays K5, K6, and K7 are all connected between V+ and a separate control output of the controller 67. The common terminals of relays K5, K6 and K7 are each connected to an off-hook detector 63, 74 and 65. The first off-hook detector 63 is also connected to the tip (T) and ring (R) terminals of the phone connector 52. The other off-hook detectors are each connected to the tip and ring terminals of a modem connector 53 and 54. Finally, the outputs of the off-hook detectors 63, 64, and 65 are each connected to a signal input of the controller 67.

As with the controller 49 of the polling controller, the controller 67 of the switch is preferably a microprocessor circuit that controls the operation of relays K3, K4, K5, K6, and K7, and other elements of the switch, namely, the generation of tones by the DTMF receiver, ring detector and tone generator 55 and the generation of ring signals by the ring generator. The operation of relays K3, K4, K5, K6, and K7 controls the connection of the hold bridge to the telco line, the connection of the ring generator to the phone and modem connectors as well as the connection of the phone and modems to the telco line. A flow diagram illustrating a suitable controller operation sequence (i.e., program) is illustrated in FIGS. 7-10 and described next.

Figure 7:
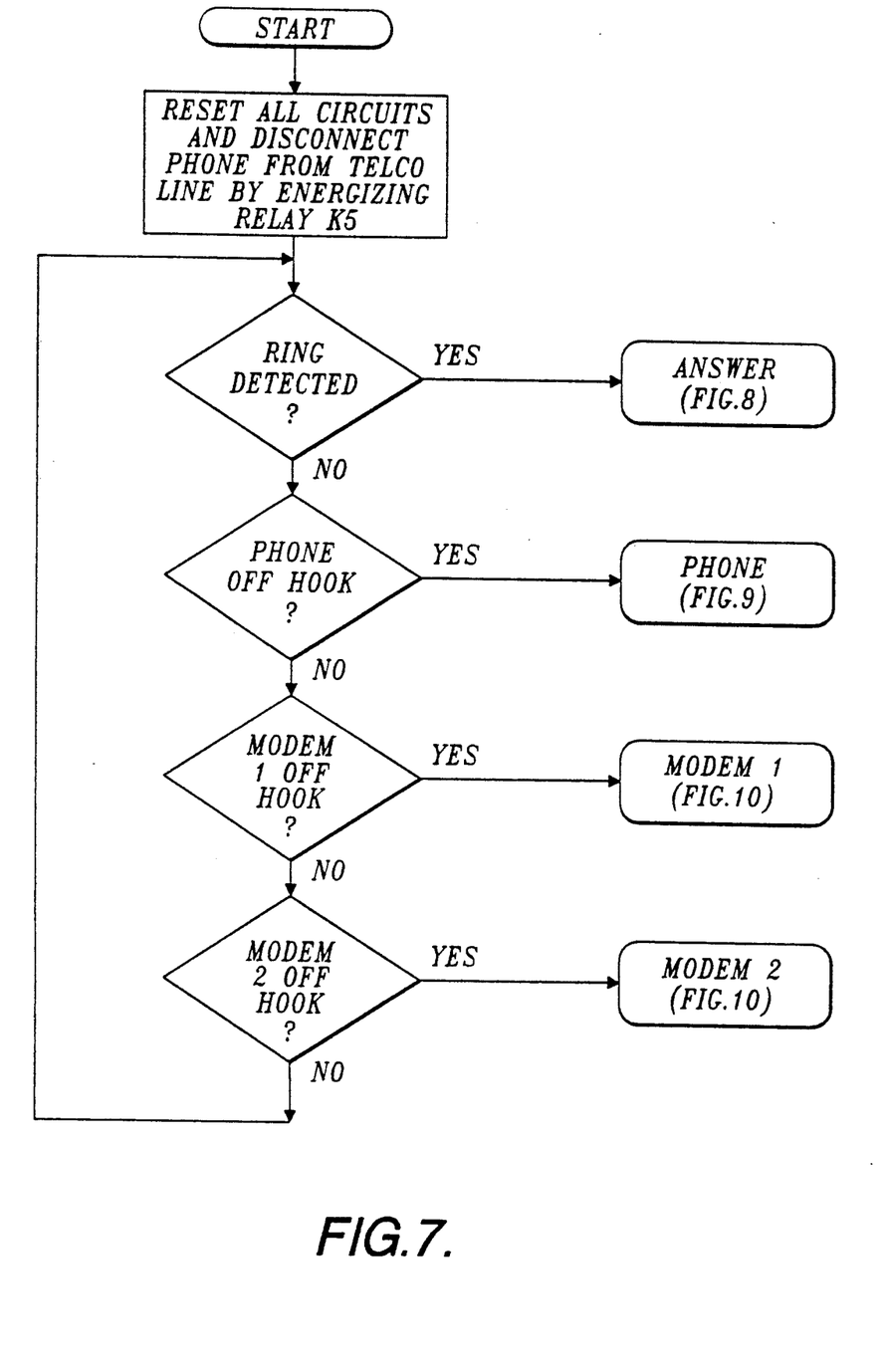
FIGS. 7-10 form a flow diagram illustrating the operation of the switch illustrated in FIG. 6.

As shown in FIG. 7, after being initialized, if necessary, the controller resets all of the circuits and disconnects the telephone 33 from the telco line by energizing relay K5. In this regard, relay K5 is connected to connect the telephone to the telco line if power to the switch is interrupted. In this way the telephone is usable even when switch power is lost.

After the telephone has been disconnected from the telco line, the controller makes a pass through a series of tests designed to detect incoming call rings and the offhook status of the telephone 33 and the modems 35a, 35b, .... In this regard, the controller first checks the DTMF receiver, ring detector, and tone generator 55 to determine if a telephone line ring has been detected. If a ring has been detected, the answer subroutine illustrated in FIG. 8 and described below is executed. If a ring has not been detected, the telephone off-hook detector 63 is tested to determine if the telephone 33 is off-hook. If the telephone 33 is off-hook, a pass is made through the phone subroutine illustrated in FIG. 9, and described below. If the telephone is not off-hook, a test is made of the modem 1 off-hook detector 64 to determine if modem 1 is off-hook. If modem 1 is offhook, a pass is made through the modem subroutine illustrated in FIG. 10 and described below. If modem 1 is on-hook, a test of the modem 2 off-hook detector 65 is made to determine if modem 2 is off-hook. If modem 2 is off-hook, a pass is made through the modem subroutine illustrated in FIG. 10 and described below. If modem 2 is not off-hook, the ring detected test is repeated.

The first step in the answer subroutine (FIG. 8) is to connect the hold bridge 59 to the telco line 51. This is accomplished by energizing relay K3. After the hold bridge has been connected to the telco line, a test is made to determine if a modem 1 switch port transfer code has been received. If a modem 1 switch transfer code has not been received, a test is made to determine if a modem 2 switch transfer code has been received. If a modem 2 switch port transfer code has not been received a test is made to determine if an answer time out interval has elapsed. If the answer time out interval has not elapsed, the modem 1 switch port transfer code test is repeated.

Figure 8:
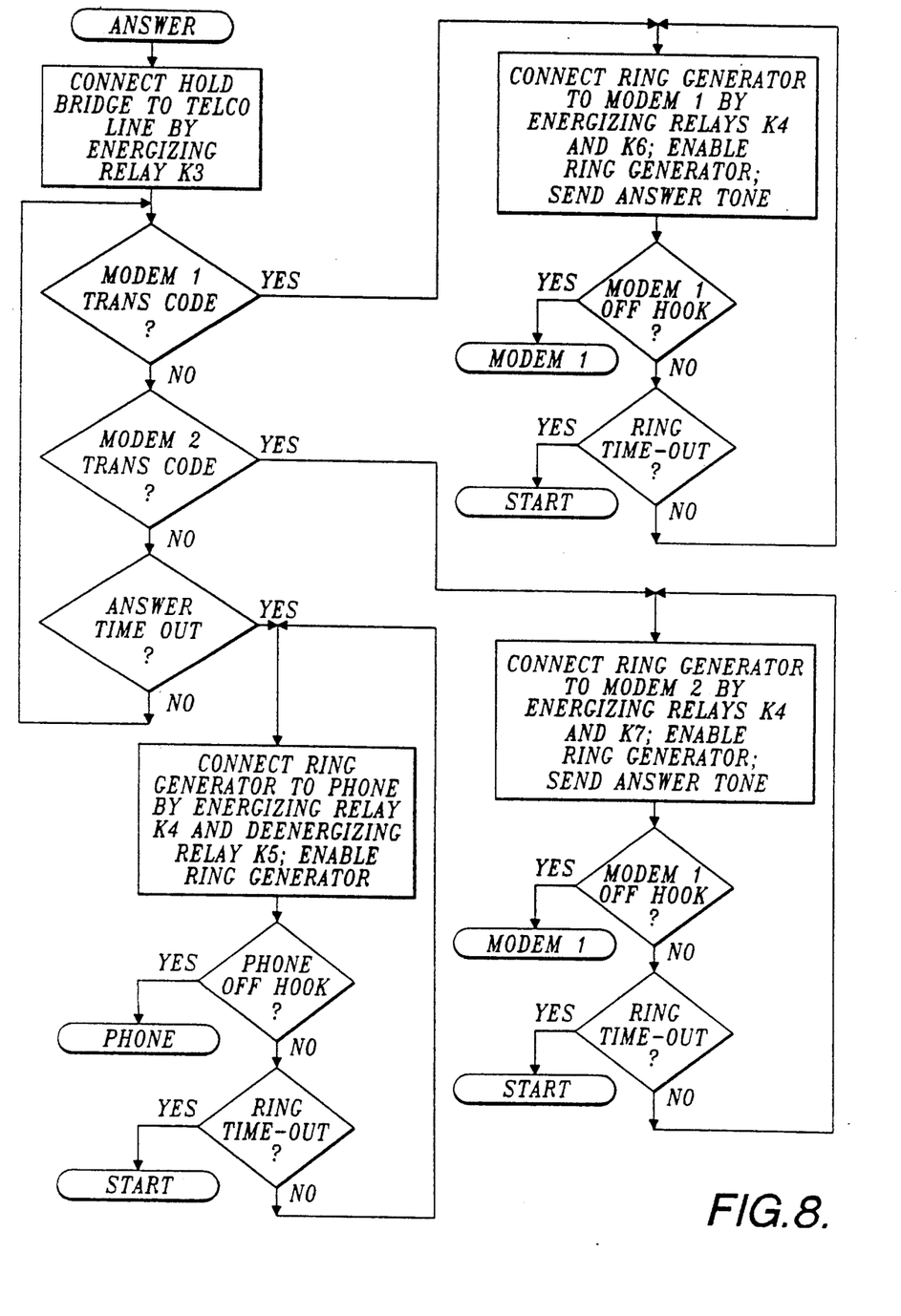

If a modem 1 switch port transfer code is detected, the ring generator is connected to modem 1 by energizing relays K4 and K6. At the same time, the ring generator 57 is enabled and an answer tone is generated by the DTMF receiver, ring detector and tone generator. Next, a test of the off-hook detector 64 is made to determine if modem 1 has gone off-hook. If modem 1 has not gone off-hook, a test is made to determine if a ring time out interval has elapsed. If the ring time out interval has not elapsed, modem 1 remains connected to the ring generation by maintaining relays K4 and K6 energized and the ring generator is again enabled. The controller remains in this loop until either the ring time out period elapses or the modem 1 goes off-hook. If the ring time out interval elapses before modem 1 goes off-hook, the controller cycles to the beginning of the controller sequence illustrated in FIG. 7 and described above. If modem 1 goes off-hook before the ring time out interval elapses, a pass is made through the modem subroutine illustrated in FIG. 10 and described below.

If a modem 2 switch port transfer code is received, the ring generator is connected to modem 2 by energizing relays K4 and K7. Simultaneously, the ring generator is enabled and an answer tone is generated. Thereafter, a test is made of the off-hook detector 65 associated with modem 2 to determine if modem 2 has gone off-hook. If modem 2 has not gone off-hook, a test is made to determine if a ring time out interval has elapsed. If the ring time out interval has not elapsed, modem 2 remains connected to the ring generator by maintaining relays K4 and K7 energized, and the ring generator is again enabled. If the ring time out interval elapses before modem 2 goes offhook, the controller cycles to the beginning of the controller sequence illustrated in FIG. 7 and described above. If modem 2 goes offhook prior to the ring time out interval elapsing, a pass is made the modem subroutine illustrated in FIG. 10 and described below.

If the answer time out interval elapses before either a modem 1 or a modem 2 switch port transfer code is received, the ring generator is connected to the telephone by energizing relay K4 and deenergizing relay K5. Simultaneously, the ring generator is enabled. Then a test is made to determine if the telephone has gone off-hook. If the telephone has not gone off-hook, a test is made to determine if a ring time-out interval has elapsed. If the ring time out interval has not elapsed, the telephone is maintained connected to the ring generator by maintaining relay K4 energized and relay K5 deenergized; and the ring generator is again enabled. If the ring time-out interval elapses before the telephone goes off-hook, the controller cycles to the beginning of the controller sequence illustrated in FIG. 7 and described above. If the telephone goes off-hook before the ring time out interval elapses, a pass is made through the telephone subroutine illustrated in FIG. 9 and described next.

Figure 9:
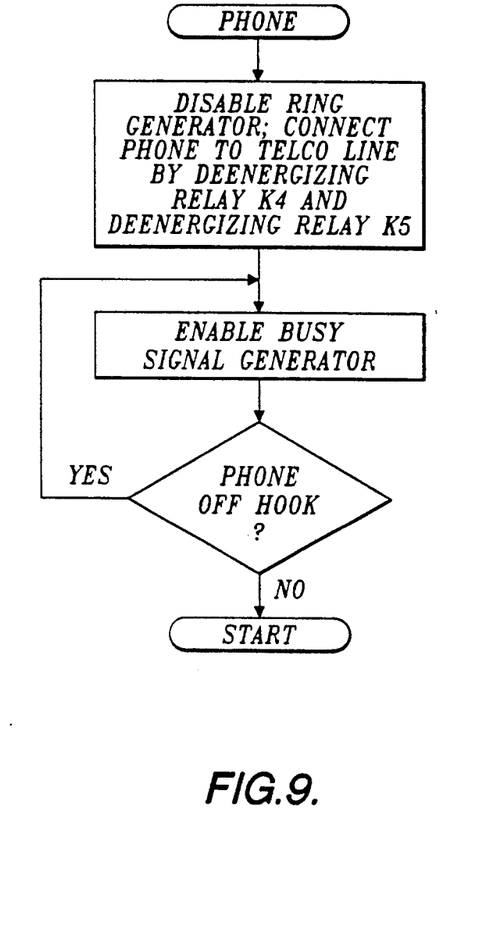

The first step in the telephone subroutine is to disable the ring generator and connect the telephone to the telco line by deenergizing relays K4 and K5. (K5 may already be deenergized depending upon whether the telephone subroutine was entered from the answer subroutine in FIG. 8 or from the test loop (FIG. 7)). In any event, after the telephone has been connected to the telco line a busy signal is applied to model 1 and modem 2 by enabling the talk battery and busy signal generator 61. Thereafter, a test is made to determine if the telephone is off-hook. If the telephone is not off-hook, the talk battery and busy signal generator remains enabled. The program remains in this loop until the telephone goes on-hook. When this occurs, the controller cycles to the beginning of the controller sequence illustrated in FIG. 7 and described above.

Figure 10:
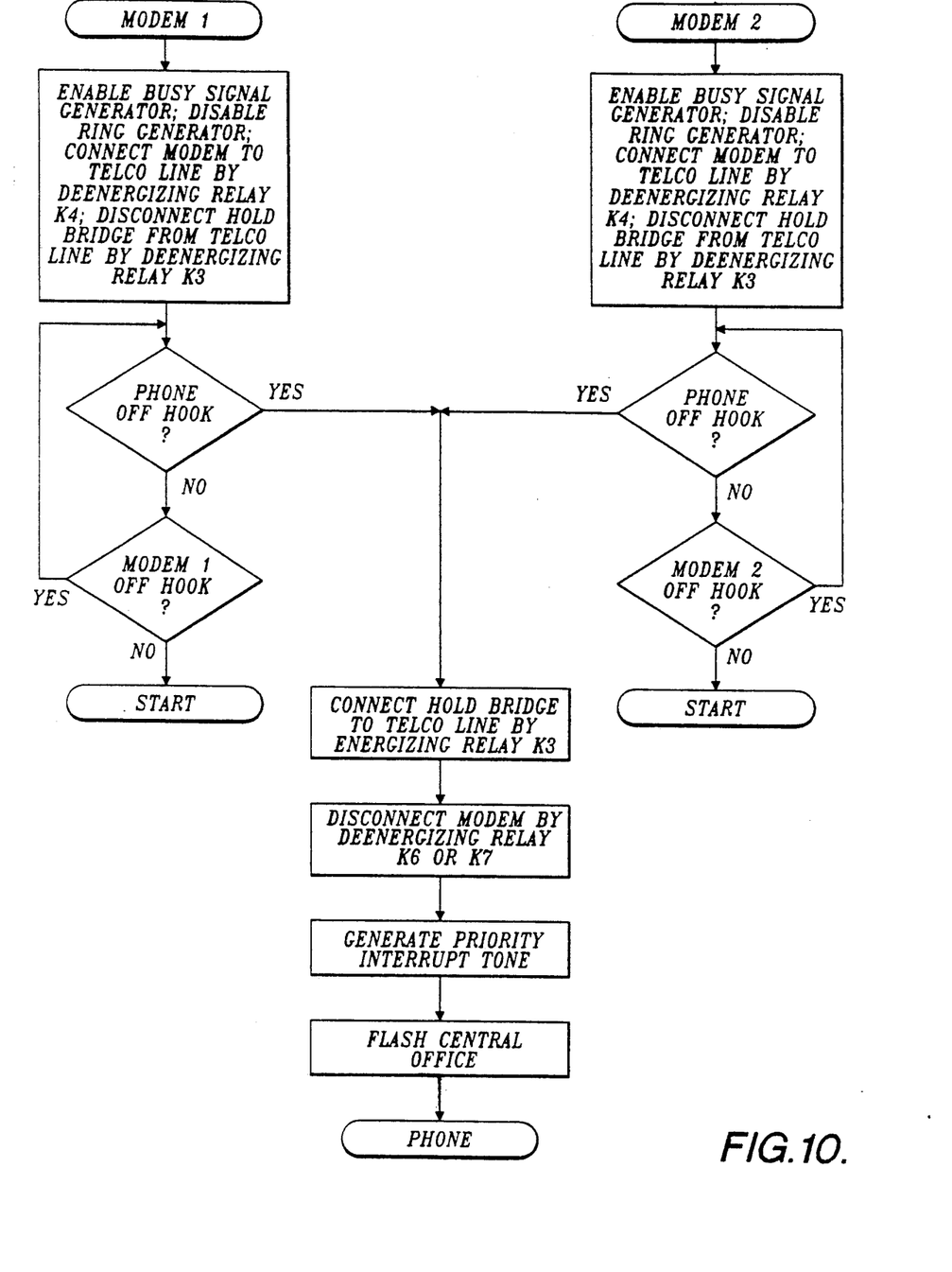

The modem subroutine illustrated in FIG. 10 has two entry points denoted modem 1 and modem 2. These correspond to the modem 1 and modem 2 outputs of the test loop (FIG. 7) and the modem 1 and modem 2 outputs of the answer subroutine (FIG. 8). If the modem subroutine is entered from the modem 1 entry point, a busy signal is generated by enabling the talk battery and busy signal generator 61. Thereafter, the ring generator 57 is disabled. Then the modem is connected to the telco line by deenergizing relay K4. Finally, the hold bridge is disconnected from the telephone line by deenergizing relay K3. Then, a test is made to determine if the telephone is off-hook. If the telephone is not off-hook, a test is made to determine if modem 1 is still off-hook. When modem 1 is still off-hook, the telephone off-hook test is repeated. The program remains in this loop until either the telephone goes off-hook or the modem 1 goes on-hook. If the telephone goes off-hook before the modem goes on-hook, a pass is made through a priority interrupt sequence of steps described below. When modem 1 goes onhook, the program cycles to the beginning of the controller sequence illustrated in FIG. 7 and described above.

If the modem subroutine is entered from the modem 2 entry point, a busy signal is produced by enabling the talk battery and busy signal generator 61. At the same time, the ring generator is disabled and the modem is connected to the telco line by deenergizing relay K4. Simultaneously, the hold bridge is disconnected from the telco line by deenergizing relay K3. Next, a test is made to determine if the telephone 33 is off-hook. If the telephone is not off-hook the off-hook state of modem 2 is determined. If modem 2 is on-hook, the telephone off-hook test is repeated. The program remains in this loop until either the telephone goes off-hook or modem 2 goes on-hook. If modem 2 goes on hook without the telephone going off-hook, the controller cycles to the beginning of the controller sequence illustrated in FIG. 7 and described above. If the telephone goes offhook before modem 2 goes on-hook, a pass is made through a priority interrupt sequence of steps illustrated in FIG. 10 and described next.

The first step in the priority interrupt sequence of steps is to connect the hold bridge to the telco line by energizing relay K3. Thereafter, the modem is disconnected from the telco line by energizing either relay K6 or K7, depending upon which modem is communicating via a telco line. Next, a priority interrupt code is generated by the DTMF receiver, ring detector, and tone generator 55. As described above, the priority interrupt tone causes the polling controller 21 located at the central station 11 to disconnect the central station's modem 23 and the telco network. Next, the central office is flashed. This is done to force the central office to supply dial tone to the remote station. If the central office is not flashed, a period of time will have to elapse before dial tone is received by the remote station telephone seizing the telco line. Flashing, in essence, is the creation of a signal on a telephone line that appears to be an on-hook, off-hook shift in states. After the central office is flashed, a pass is made through the telephone subroutine illustrated in FIG. 9 and described above.

As will be readily appreciated from the foregoing description, the invention provides a system for polling a plurality of data sources, i.e., computers, from a central station in a manner that minimizes interconnect time, i.e., the time it takes for the central station to begin data communication with a called remote station. This result is achieved by the use of a polling controller that temporarily disconnects the modem of the central station from its telco line. During modem disconnection, the central station modem is prevented from downshifting while a telephone network connection is being made to the remote station by placing the central station modem on hold. As soon as an answer tone is received by the polling controller, the polling controller reconnects the central station modem to the telco line. Immediately after reconnection occurs, data communication can begin. As a result, in contrast to systems that allow a fixed period of time for telephone connection to take place, during which data communication is delayed, no data communication delays occur when a polling controller formed in accordance with this invention is included in a computerized polling system.

While a preferred embodiment of the invention has been illustrated and described, it will be appreciated that, within the scope of the appended claims, various changes can be made therein.

The embodiments of the invention in which an exclusive property or privilege is claimed are defined as follows:

1. A polling controller for a polling system in which a central station sequentially contacts a plurality of remote stations via a telephone network using a modem connected between a central station computer and the telephone network, said polling controller comprising:
    (a) off-hook detection means for detecting when a modem goes off-hook;
    (b) hold means for preventing a modem from responding to telephone line loop activity;
    (c) signal transceiver means for transmitting and receiving telephone signals; and
    (d) switch means connected to said off-hook detection means, said hold means and said signal transceiver means for;
        (i) detecting when a modem connected to said off-hook detection means goes off-hook;
        (ii) preventing said modem from responding to telephone line loop activity after said modem goes off-hook;
        (iii) causing said signal transceiver means to repetitively generate a switch port transfer code;
        (iv) detecting an answer signal; and
        (v) allowing said modem to respond to telephone line loop activity.

2. A polling controller as claimed in claim 1, wherein said switch means includes first connecting means for connecting said signal transceiver means to and disconnecting said signal transceiver means from a telephone line.

3. A polling controller as claimed in claim 2, wherein said first connecting means connects said signal transceiver means to said telephone line and to the output of said modem when said off-hook detection mean detects an off-hook modem.

4. A polling controller as claimed in claim 3, wherein said first connecting means disconnects said signal transceiver means from said telephone line and said modem when said signal transceiver means receives a priority interrupt tone while said first connecting means is connecting said modem to said telephone line.

5. A polling controller as claimed in claim 1, 2, 3 or 4, wherein said hold means is a hold circuit and wherein switch means includes second connecting means for connecting said hold circuit to and disconnecting said hold circuit from a modem.

6. A polling controller as claimed in claim 5, wherein said hold circuit comprises a hold bridge.

7. A polling controller as claimed in claim 5, wherein said second connecting means connects said modem to said hold bridge if said signal transceiver means detects a modem-produced dial code.

8. A polling controller as claimed in claim 7, wherein said hold circuit comprises a hold bridge.

9. A polling controller as claimed in claim 7, wherein said switch port transfer code generated by said switch means is the same as said modem-produced dial code.

10. A polling controller as claimed in claim 9, wherein said hold circuit comprises a hold bridge.

11. A polling system comprising:
    a telephone network;
    a plurality of remote stations connected to said telephone network, each of said remote stations including a telephone, at least one modem, at least one computer connected to said modem, and a switch for selectively connecting said modem and said telephone to said telephone network in response to a switch port transfer code; and
    a central station connected to said telephone network, said central station including a computer, a modem connected to said computer and a polling controller connected between said modem and said telephone network for assisting communication between the modem of said central station and the modems of said remote stations, said polling controller comprising:
        (a) off-hook detection means for detecting when said central station modem goes off-hook;
        (b) hold means for preventing said central station modem from responding to telephone line loop activity;
        (c) signal transceiver means for transmitting and receiving telephone signals; and
        (d) switch means connected to said off-hook detection means, said hold means and said signal transceiver means for:
            (i) detecting when said central station modem goes of-hook;
            (ii) preventing said central station modem from responding to telephone line loop activity after said central station modem goes off-hook;
            (iii) causing said signal transceiver means to repetitively generate said switch port transfer code;
            (iv) detecting an answer signal from a remote station; and
            (v) allowing said central station modem to respond to telephone line loop activity.

12. A polling system as claimed in claim 1, wherein said switch means includes first connecting means for connecting said signal transceiver means to and disconnecting said signal transceiver means from a telephone line.

13. A polling system as claimed in claim 12, wherein said first connecting means connects said signal transceiver means to said telephone line and to the output of said central station modem when said off-hook detection means detects an off-hook central station modem.

14. A polling system as claimed in claim 13, wherein said first connecting means disconnects said signal transceiver means from said telephone line and said central station modem when said signal transceiver means receives a priority interrupt tone while said first connecting means is connecting said central station modem to said telephone line.

15. A polling system as claimed in claim 11 wherein said priority interrupt tone is produced by the switch of one of said remote stations.

16. A polling system as claimed in claim 11, 12, 13, 14 or 15, wherein said hold means is a hold circuit and wherein said switch means includes second connecting means for connecting said hold circuit to and disconnecting said hold circuit from said central station modem.

17. A polling system as claimed in claim 16, wherein said hold circuit comprises a hold bridge.

18. A polling system as claimed in claim 16, wherein said second connecting means connects said central station modem to said hold bridge if said signal transceiver means detects a dial code produced by said central station modem.

19. A polling system as claimed in claim 18, wherein said hold circuit comprises a hold bridge.

20. A polling system as claimed in claim 18, wherein said switch port transfer code generated by said switch means is the same as said dial code.

21. A polling system as claimed in claim 20, wherein said hold circuit comprises a hold bridge.

22. A polling system comprising:
   a telephone network;
   a plurality of remote stations connected to said telephone network, each of said remote stations including a telephone, at least one modem, at least one computer connected to said modem, and a switch for selectively connecting said modem and said telephone to said telephone network in response to a switch port transfer code; and
   a central station connected to said telephone network, said central station including a computer, a modem connected to said computer and a polling controller connected between said modem and said telephone network for assisting communication between the modem of said central station and the modems of said remote stations, said polling controller comprising:
   (a) off-hook detection means for detecting when said central station modem goes off-hook;
   (b) signal transceiver means for transmitting and receiving telephone signals; and
   (c) switch port transfer code means connected to said off-hook detection means and said signal transceiver means for:
      (i) detecting when said central station modem goes off-hook;
      (ii) causing said signal transceiver means to repetitively generate a switch port transfer code;
      (iii) detecting an answer signal from a remote station; and
      (iv) causing said signal transceiver means to stop repetitively generating said switch port transfer code means when said answer signal is detected.

23. A polling system as claimed in claim 22, wherein said switch port transfer code means causes said signal transceiver means to repetitively generate said switch port transfer code only if said signal transceiver means detects a modem produced dial code.

24. A polling system as claimed in claim 23, wherein said switch port transfer code generated by said switch port transfer code means is the same as said modem produced dial code.

25. A polling controller for a polling system in which a central station sequentially contacts a plurality of remote stations via a telephone network using a modem connected between a central station computer and the telephone network, said polling controller comprising:
   (a) off-hook detection means for detecting when a modem goes off-hook;
   (b) signal transceiver means for transmitting and receiving telephone signals; and
   (c) switch port transfer code means connecting to said off-hook detection means and said signal transceiver means for:
      (i) detecting when a modem connected to said off-hook detection means goes off-hook;
      (ii) causing said signal transceiver means to repetitively generate a switch port transfer code;
      (iii) detecting an answer signal; and
      (iv) causing said signal transceiver means to stop repetitively generating said switch port transfer code when said answer signal is detected.

26. A polling controller as claimed in claim 25, wherein said switch port transfer code means causes said signal transceiver means to repetitively generate said switch port transfer code only if said signal transceiver means detects a modem-produced dial code.

27. A polling controller as claimed in claim 26, wherein said switch port transfer code generated by said switch port transfer code means is the same as said modem-produced dial code.

* * * * *

UNITED STATES PATENT AND TRADEMARK OFFICE
CERTIFICATE OF CORRECTION

PATENT NO. : 5,241,587

DATED : August 31, 1993

INVENTOR(S) : S. W. Horton et al.

It is certified that error appears in the above-indentified patent and that said Letters Patent is hereby corrected as shown below:

| COLUMN | LINE | |
|---|---|---|
| 1 | 16 | "obtaining" should read --obtain-- |
| 2 | 37 | "stations" should read --station-- |
| 3 | 60 & 61 | "system," should read --system-- |
| 5 | 38 | "offhook" should read --off-hook-- |
| 5 | 68 | "lien" should read --line-- |
| 6 | 7 | "off hook" should read --off-hook-- |
| 7 | 58 | "74" should read --64-- |
| 8 | 21 | "offhook" should read --off-hook-- |
| 8 | 33 | "offhook" should read --off-hook-- |
| 9 | 18 | "offhook" should read --off-hook-- |
| 9 | 20 | "offhook" should read --off-hook-- |
| 9 | 21 | after "made" insert --through-- |
| 9 | 50 | "model 1" should read --modem 1-- |
| 10 | 11 | "onhook" should read --on-hook-- |
| 10 | 17 | "disabled and" should read --disabled, and-- |
| 10 | 29 | "offhook" should read --off-hook-- |

UNITED STATES PATENT AND TRADEMARK OFFICE
CERTIFICATE OF CORRECTION

PATENT NO. : 5,241,587
DATED : August 31, 1993
INVENTOR(S) : S. W. Horton et al.

It is certified that error appears in the above-indentified patent and that said Letters Patent is hereby corrected as shown below:

| COLUMN | LINE | |
|---|---|---|
| 11 (Claim 1, | 28 Line 14) | "for;" should read --for:-- |
| 12 (Claim 12, | 46 Line 1) | "claim 1" should read --claim 11-- |

Signed and Sealed this

Twelfth Day of April, 1994

Attest:

BRUCE LEHMAN

Attesting Officer    Commissioner of Patents and Trademarks